Figures 1, 2:
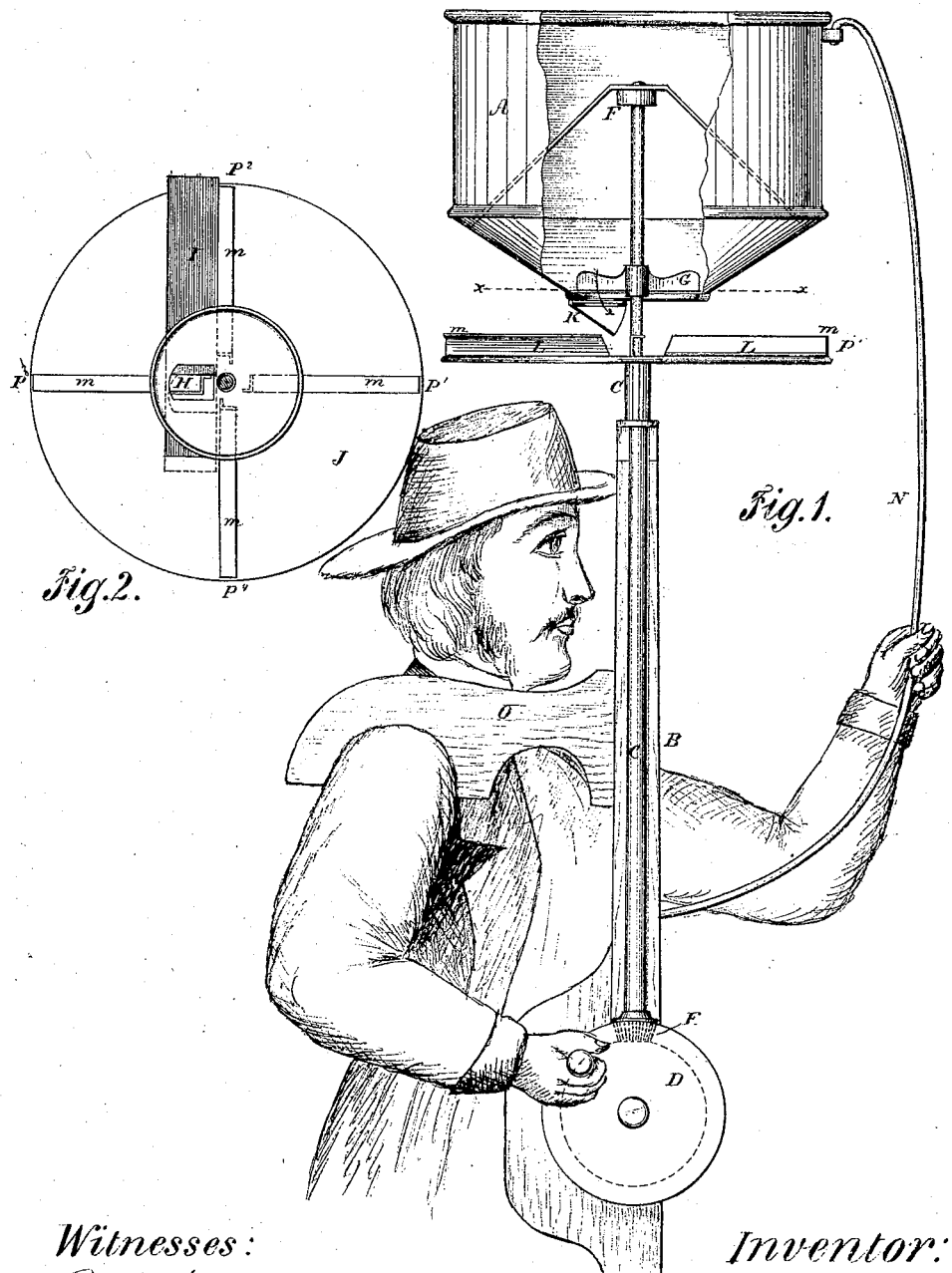

J. C. KURTZ.
Broadcast Seeder.

No. 101,136. Patented March 22, 1870.

Witnesses:
Fred Artos
Geo. Ritter

Inventor:
Jacob C Kurtz
by D. C. Colby & Son
Attorneys

United States Patent Office.

J. C. KURTZ, OF WOOSTER, OHIO.

Letters Patent No. 101,136, dated March 22, 1870.

IMPROVEMENT IN BROADCAST SEEDER.

The Schedule referred to in these Letters Patent and making part of the same.

*To whom it may concern:*

Be it known that I, J. C. KURTZ, of Wooster, in the county of Wayne and State of Ohio, have, as I believe, invented new and useful Improvements in Broadcast Grain and Seed-Sowers; and do hereby declare the following to be a full and exact description of the same, reference being had to the drawings that accompany and form part of these specifications.

Figure 1 represents a side elevation, and the machine in use.

Figure 2, a plan looking downwards from line $x\, x$ in red in fig. 1.

Letter A, chamber for holding the grain to be sown.

B, the standard supporting the principal parts.

C, revolving upright shaft, upon the upper end of which rests, as illustrated in fig. 3, the chamber A.

D, a gear-wheel attached to standard B, so its cogs may mesh into those on the shaft C at E.

E, small cog-wheel on the upright shaft C, for purposes just above mentioned.

F, a support to the upper end of shaft C, and retains and keeps the chamber A.

G, narrow arms or wings upon the shaft C, in position exhibited in fig. 1.

H, an opening near the central portion of the base of the chamber A.

I, a slide with which to open or close, or regulate the extent of opening H.

J is a disk attached to shaft C, and rotating with it.

K, a short spout to direct the grain into the central upper surface of disk J.

L, thin strips rising upwards from upper surface of disk J, with their upper edges turned over, forming each a horizontal flange, $m$, and arranged as represented in fig. 2.

N, a rod attaching by one end to the standard B, the other to chamber A, and enabling the operator to give support to the apparatus with one hand, while the other is used to rotate the wheel D.

O, a yoke to rest upon the shoulder of the operator.

The object of my invention is not only to provide a convenient device for sowing grain broadcast with great dispatch, but, by a peculiar structure and combination of parts, to secure more uniformity in the distribution of the seed.

The nature of my device consists in locating the seed-chamber A above any obstructions to the seed as it is thrown off from the rapidly-rotating disk J, in the application of the stirring arms or fans G, and the formation and arrangement of the strips L.

The plane of the disk J, the vertical portion of the strips L, and the flanges $m$ of the latter, together, form a channel along which the seed, having fallen through the opening H, is carried by centrifugal force, to be thrown off at $P^1\, P^2\, P^3\, P^4$.

The operation is this:

Having placed a portion of seed in the chamber A, open the slide I, graduating the opening, as experience will teach, to the size of the seeds being sown, and the freedom of the flow may indicate, and then bring the machine to position as in fig. 1, the yoke O resting on the operator's shoulder, who now turns the wheel D, which rapidly revolves the shaft C; the arms or fans G keep the seed in motion in the base of chamber A, which, constantly falling through opening H, finds its way, as above mentioned, to the periphery of disk J, from which it is distributed in a horizontal direction on every side.

As the ground frontward and rearward would receive more than each right and left quarter, each repeated passage back and forth across the field should be so directed as to cause the seed dropping to overlap about one-third, or so, after the same manner farmers do in sowing broadcast by hand.

I have represented my device as propelled by hand, and carried by the operator; but I do not consider the manner of applying the motive-power or conveying the machine as any part of my invention, therefore one may adapt a running-gear of a wagon, or a common light farm wagon, for conveyance, the sower, that is the operator, working the machine while sitting or standing upon the wagon, having a suitable rest or support for the standard B, or, if he prefers, he may make proper connections with one or more of the wheels or axles of the wagon used, and rotate the shaft C by the power thus derived.

What I claim, and desire to secure by Letters Patent, is—

1. The disk J, when supplied with the flanged strips L, arranged for the purposes specified.

2. The chamber A, when provided with arms G, slide I, and opening H, arranged in combination with the shaft C and disk J, as described and set forth.

In testimony whereof I have signed my name to this specification in the presence of two subscribing witnesses.

J. C. KURTZ.

Witnesses:
OHIO F. JONES,
J. H. CARR.